(12) United States Patent
Chew et al.

(10) Patent No.: US 8,835,832 B2
(45) Date of Patent: Sep. 16, 2014

(54) OPTICAL ENCODER WITH SIGNAL OFFSET CORRECTION SYSTEM

(75) Inventors: Gim Eng Chew, Penang (MY); Kheng Hin Toh, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 225 days.

(21) Appl. No.: 13/352,152

(22) Filed: Jan. 17, 2012

(65) Prior Publication Data
US 2013/0181122 A1    Jul. 18, 2013

(51) Int. Cl.
*G01D 5/34*    (2006.01)

(52) U.S. Cl.
USPC .................................. 250/237 G; 250/231.18

(58) Field of Classification Search
USPC ............................ 250/231.13–231.18, 237 G
See application file for complete search history.

(56) References Cited

U.S. PATENT DOCUMENTS

| 4,900,924 A * | 2/1990 | Masuda et al. ............ 250/227.17 |
| 8,497,469 B2 * | 7/2013 | Nagura ..................... 250/231.14 |
| 2011/0106488 A1 | 5/2011 | Fujita |

FOREIGN PATENT DOCUMENTS

| JP | 7296494 | 11/1995 |
| JP | 10122907 | 5/1998 |
| JP | 2007327770 | 12/2007 |
| WO | WO-2011057727 | 5/2011 |

* cited by examiner

*Primary Examiner* — Tony Ko

(57) ABSTRACT

An offset correction system for correcting signal offset of an encoder. The offset correction system may include a light emitter, an encoder disk, a reticle, a light detector; an offset detection circuit and an offset correction circuit. The offset detection circuit may comprise a comparator and an offset detector configured to receive sinusoidal output signals from the light detector and a reference signal to create digital pulses for determining the signal offset. The offset correction circuit may be configured to apply a gain to correct the offset output signal. The offset correction may be implemented in real time mode.

19 Claims, 7 Drawing Sheets

| Count of High Pulse | Count of Low Pulse | Position from Ideal $V_{mid}$ | Counter Output (2 digital Bits) | Offset Controller Action |
|---|---|---|---|---|
| Equal | Equal | None | 00 | Do Nothing |
| Lower | Higher | Lower | 01 | Tune up input signal |
| Higher | Lower | Higher | 10 | Tune down input signal |

OPTICAL ENCODER WITH SIGNAL OFFSET CORRECTION SYSTEM

BACKGROUND

Optical encoders are conventionally used as motion detectors in applications such as closed-loop feedback control in a motor control system. A typical optical encoder has a light emitter, an encoder disk with a plurality of apertures and a light detector (e.g. photodetectors.) In optical encoder systems, a reticle may be disposed between the light emitter and the light detector to modify the pattern and size of the light projected on the light detector. A reticle is typically used for adjusting a spatial resolution requirement for the encoder system. Smaller reticles may produce output signals having increased spatial resolution than those generated using the larger reticles.

In general, an optical encoder works by emitting a collimated light beam towards the encoder disk. The light beam is interrupted by the encoder disk, as the encoder disk moves. Portions of the collimated light beam project through the apertures onto the photodetectors. As the encoder disk moves, light patterns falling on the photodetectors change. The photodetectors detect these light patterns to generate corresponding output signals, which can be processed to produce digital waveforms. Such digital waveforms of the output signals can be subsequently translated to motion information, for example, a position or a velocity of a motor.

While optical encoder systems can be effective, encoder systems are still prone to undesired variations in output signal offsets, which may be caused by misalignment of components inside the encoder system. For example, signal offsets may be caused by misalignment of the reticle position, in relation to the light emitter and the light detector. In addition, there may be undesired signal offsets, due to errors occurring during the manufacture of the optical encoder. For example, there may be a misalignment in placement of the photodetectors. Further, there may be wobbling of the encoder disk. Additionally, there may be non-uniformity of a light spot of the light emitter. The foregoing may offset the output signal generated by the encoder system.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION

The present disclosure provides an offset correction system for an optical encoder. The offset correction system may be implemented to correct a signal offset. Such offset may be due to misalignments of components inside an encoder system. For example, there may be misalignment in placement of photodetectors, reticle misalignment, encoder disk wobbling and/or light spot nonuniformity.

Figure 1:
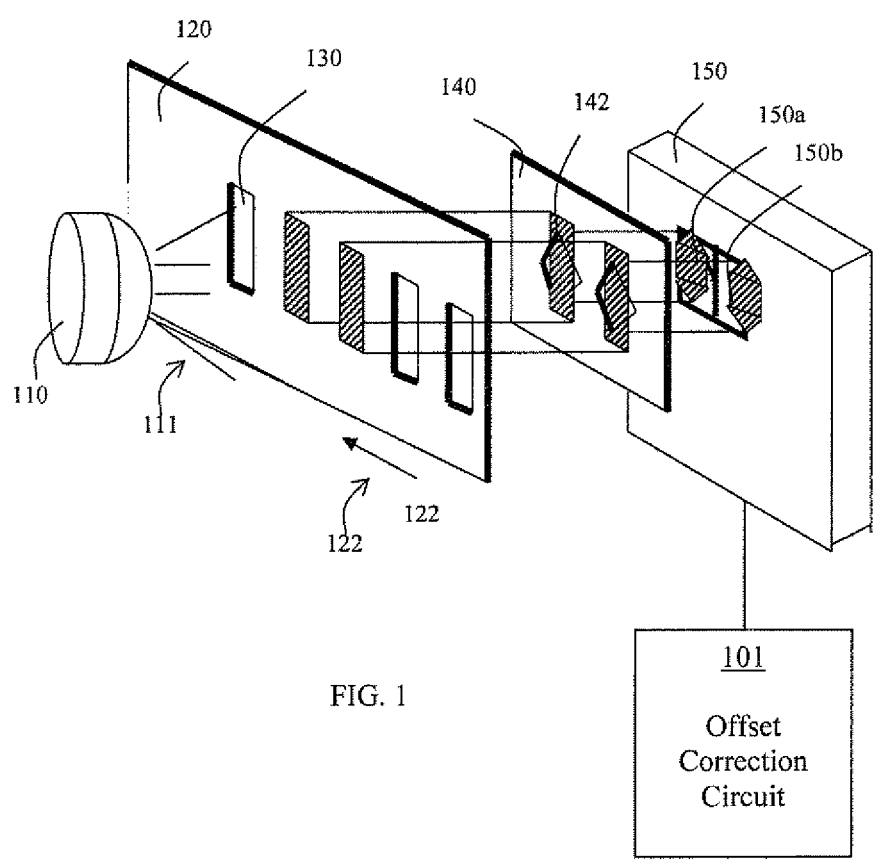
FIG. 1 shows an optical encoder with a reticle.

FIG. 1 shows an optical encoder 100. The optical encoder 100 may include an offset correction circuit 101. The optical encoder 100 may include a light emitter 110 configured to emit a collimated beam of light 111, an encoder disk 120 having a plurality of apertures 130, a reticle 140, a light detector 150 with photodetectors 150a and 150b. Light emitter 110, typically an LED (Light Emitting Diode) or other appropriate light source may have various wavelengths depending on the desired application, and may project a collimated light beam 111 onto the encoder disk 120. As the encoder disk 120 may move in one direction, for example, in direction 122, the collimated light beam 111 may be interrupted by masked or optically non-transparent portion of the encoder disk 120. Portions of the collimated light beam 111 may project through apertures 130 onto the light detector 150 and may sweep across the photodetectors 150a and 150b. As the encoder disk 120 moves, the light pattern 142 projected onto the photodetectors 150a and 150b may change; thus corresponding output signals generated by of the photodetectors 150a and 150b may also change accordingly. These output signals may subsequently be translated to motion information corresponding to an object position or a velocity.

As shown in FIG. 1, the optical encoder 100 may include reticle 140. The reticle 140 may be implemented to generate a quasi sinusoidal signal. Further, reticle 140 may be implemented to change or adjust the spatial resolution of the encoder 100. For example, a standard optical encoder system may have a standard size of photodetectors. Reticle 140 may therefore be disposed between the light emitter 110 and the light detector 150 to alter the spatial resolution of the encoder by modifying the light beams impinging the light detector 150. In general, a small reticle may be preferable over a larger reticle because a smaller reticle may generate output signals having increased spatial resolution, relative to those that may be generated using a larger reticle.

Alignment of the reticle may be critical to accuracy of an encoder system. A misalignment of reticle with respect to the encoder disk may cause an offset to the output signal generated by the encoder system. In addition, signal offset may also occur due to misalignment of other components inside the encoder system. For example, code wheel wobbling, code wheel process tolerance such as TIR (Total Indicated Runout), tolerance for the placement of the photodetectors in relative to the code wheel and non-uniformity of the light spot, may all cause the output signals generated by an encoder system to have an offset. Accordingly, offset correction circuit 101 may be advantageously coupled to photodetectors 150a and 150b for receiving the output signals generated by photodetectors 150a and 150b.

Figure 2:
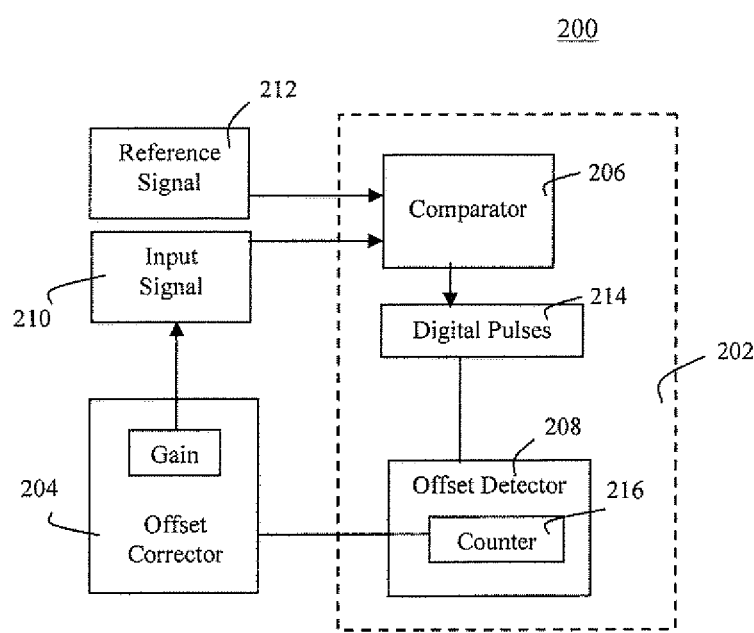
FIG. 2 is a block diagram of an offset correction system for an optical encoder.

FIG. 2 shows a block diagram of an offset correction system 200 of an optical encoder. The offset correction system 200 may include an offset detection circuit 202 and an offset corrector 204. In one embodiment, the offset detection circuit 202 may be configured to detect offsets of sinusoidal output signals generated by the light detector of the optical encoder. Offset corrector 204 may correct detected offsets. The offset detection circuit 202 may include a comparator 206 and an offset detector 208. The comparator 206 may be configured to receive input signals 210 and a reference signal 212. Comparator 206 may generate digital pulses 214 corresponding to both signals received.

The input signals 210 may comprise the sinusoidal output signals generated by the light detector 150, as shown in FIG. 1. In FIG. 1, the photodetectors (150a and 150b) may generate sinusoidal output signals in response to light emitted by the light source 110. In fact, the sinusoidal output signals, which may be generated by the photodetectors in response to light, may be in the form of photocurrents. For simplicity, the output signals generated by the light detector of an encoder system are also referred to as sinusoidal output signals instead of photocurrents throughout this application. The sinusoidal output signals may be converted to voltage by an amplifier, for example, a Transimpedence Amplifier (TIA). The sinusoidal output signals generated by the light detector, in some cases, may be further amplified before being input to the comparator 206. For example, in certain design, the light detector of an encoder system may only be able to generate small photocurrents due to the implementation of a weak light source. Therefore in practice, prior to being fed into the comparator 206, the sinusoid output signals generated by the light detector may be amplified, so that it may contain big enough voltage peaks to become significant or useful.

In one embodiment, the reference signal 212 may be a reference voltage or a voltage value, which may be at or near the middle point of the sinusoidal output signals generated by an encoder system under a preferred condition. In theory, a fully aligned encoder system may be expected to generate a perfect sinusoidal output signal with a center right at the middle of the generated sinusoidal output signals. For example, if a fully aligned encoder system generates a sinusoidal output signal having a $V_{pp}$=1V, $V_{min}$ at 2V and $V_{max}$ 3V respectively, the $V_{mid}$ (or voltage value of the center) of this sinusoidal output signal may be at 2.5V. As such, this $V_{mid}$ value may be used as an ideal voltage value representing a perfect alignment scenario. Thus the $V_{mid}$ may be used as a reference signal for gauging offsets of sinusoidal output signals generated by the encoder system. The voltage value of the in this case 2.5V, may be set as reference voltage by the offset detection circuit 202 for gauging offset, therefore in the event if the $V_{mid}$ of a sinusoidal output signal generated by the encoder system 200 is found vary from the 2.5V, this would mean that the generated sinusoidal output signal has an offset.

The comparator 206 may receive input signals 210 and a reference signal 212 to create digital pulses 214, which may correspond to both signals received. In one embodiment, the comparator 206 may digitize the input signals 210 and the reference signal 212 to digital pulses 214, which may comprise logic high level pulses separated by logic low level pulses (or HIGH and LOW pulses respectively). The digital pulses 214 may contain information about the offset of the sinusoidal signals with respect to the reference signals 212.

In one embodiment, the offset detector 202 may be configured to determine an offset of the input signal 210 from the digital pulses 214. The offset detector 202 may include a counter 216 configured to determine width of the digital pulses 214. In one embodiment, the width of the high and low digital pulses created by the comparator 206 may have an equal value when the encoder system 200 is fully aligned. In other words, when the encoder system 200 is fully aligned, the sinusoidal output signals generated by the encoder system 200 may have no offset from alignment. Similarly, in terms of time domain, when the encoder system 200 is fully aligned, the time of the digitized high pulse may be equal to the time of the digitized low pulse.

Alternatively, if the sinusoidal output signals have an offset to a higher side, say at 2.8V if compared to a reference voltage of 2.5V (as in the previous example), the time of the digitized high pulse may be longer than the time of the digitized low pulse when compared with the reference voltage of 2.5V.

In one embodiment, the offset detector 202 may comprise a counter 216 coupled with an internal clock (not shown), which may be configured to determine the width of the digital pulses. The counter 216 may count a number of cycles of the internal clock, relative to the high and low pulse width of the digitized output signals generated by the comparator 206. Thus if the sinusoidal output signals generated by the encoder system 200 have no offset, the counts of the internal clock of the digitized high pulse should be equal to the counts of the internal clock of the low pulse. This is also true if the $V_{mid}$ of a sinusoidal output signal generated by the encoder system matches the voltage of the reference signal 212. If the sinusoidal output signals have been offset to a higher side, say if the midpoint of the sinusoidal output signal is at 2.8V, the count of the digitized high pulse may be greater than the count of the low pulse.

The offset corrector 204 may be coupled with the offset detection circuit 202 to correct signal offsets. The offset corrector 204 may be configured to correct the offset both in real time mode during operation and also during factory calibration. In one embodiment, offset corrector 204 may receive information of a number of cycles of the internal clock, relative to the width of the digitized high and low pulse from the counter 216 to correct the offset, if any. The offset corrector 204 may subsequently determine the amount of gain to apply in order to tune the middle point of the sinusoidal output signal (or the input signal 210) up or down to correct the offset.

The offset corrector 204 may further include a DAC (Digital to Analog Converter), whereby the offset corrector may increase the values in the DAC, which may be subsequently used to bias the offset signals. For example if the input signals 210 is found to have been offset to a higher side, say if the detected midpoint of that signal is at 2.8V (compared to the reference signal $V_{mid}$ at 2.5V), the DAC may be triggered to set a certain reference voltage, which may acts as a DC (Direct Current) point, to bias the offset input signal. Details of the offset correction will be discussed further under FIG. 7.

Figure 3:
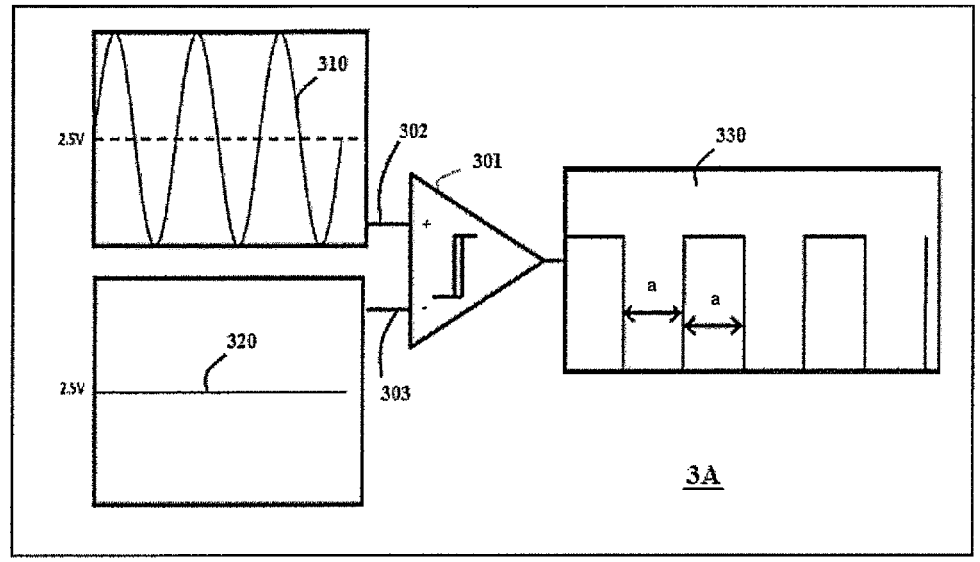
FIG. 3 illustrates various examples of input and output signals of a comparator.
Figure 3:
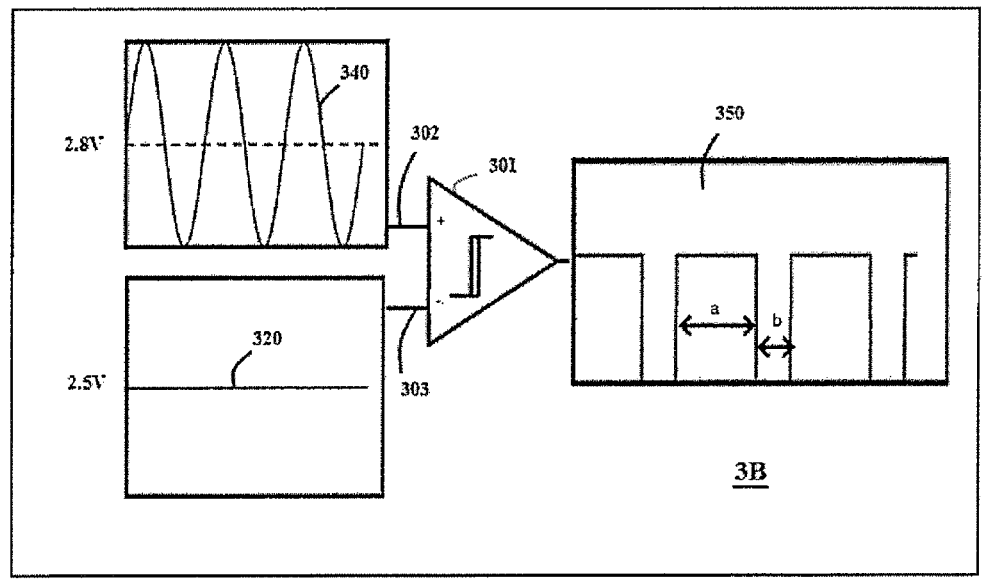

FIG. 3 illustrates examples of input and output signals of a comparator of an encoder system with the signal offset correction. In one embodiment, the comparator 301 receives input signals 310 and a reference signal 320 to create digital pulses 330 corresponding to both signals received. As described in previous paragraphs herein with respect to FIG. 1, the input signals 310 may be sinusoidal output signals generated by the light detector, whereas the reference signal 320 may be a reference voltage ($V_{ref}$)) or the targeted voltage of a sinusoidal output signal generated by a light detector under a perfect condition.

In the example illustrated in diagram 3A, the comparator 301 may be configured to receive input signals 310 and a reference signal 320 ($V_{ref}$) to its positive side 302 and negative side 303 respectively. Comparator 301 may subsequently generate digital pulses 330 as output. The digital pulse 330 may comprise logic high level pulses separated by logic low level pulses (or HIGH and LOW pulses respectively). For example, if the $V_{ref}$ 320 is set at 2.5V and input signal 310 to the positive side 302 of the comparator 301 is a sinusoidal output signal having a $V_{pp}$=1V, $V_{min}$ at 2V and $V_{max}$ 3V respectively, the $V_{mid}$ of the input signal 310 may thus be expected to match with the $V_{ref}$ 320. Therefore the $V_{mid}$ of the input signal 310 received by the comparator 301 may match the $V_{ref}$ 320, hence the width of the HIGH and LOW digital pulses 330 generated by the comparator 301 may be expected to have the same value (width value="a"). In other words, in the example shown in diagram 3A, the sinusoidal output signals generated by the encoder system may have no offset.

In a different example shown in diagram 3B, if the $V_{ref}$ 320 is set at 2.5V and the sinusoidal output signal 340 has a $V_{mid}$ of 2.8V. Therefore, the $V_{mid}$ of an sinusoidal output signal 340 received by the comparator 301 and the $V_{ref}$ 320 may have a mismatch. As a result, the width of the HIGH digital pulses 350 and LOW digital pulses generated by the comparator 301 would be different, hence suggesting that the input sinusoidal output signals generated by the encoder system may have an offset.

Figure 4:
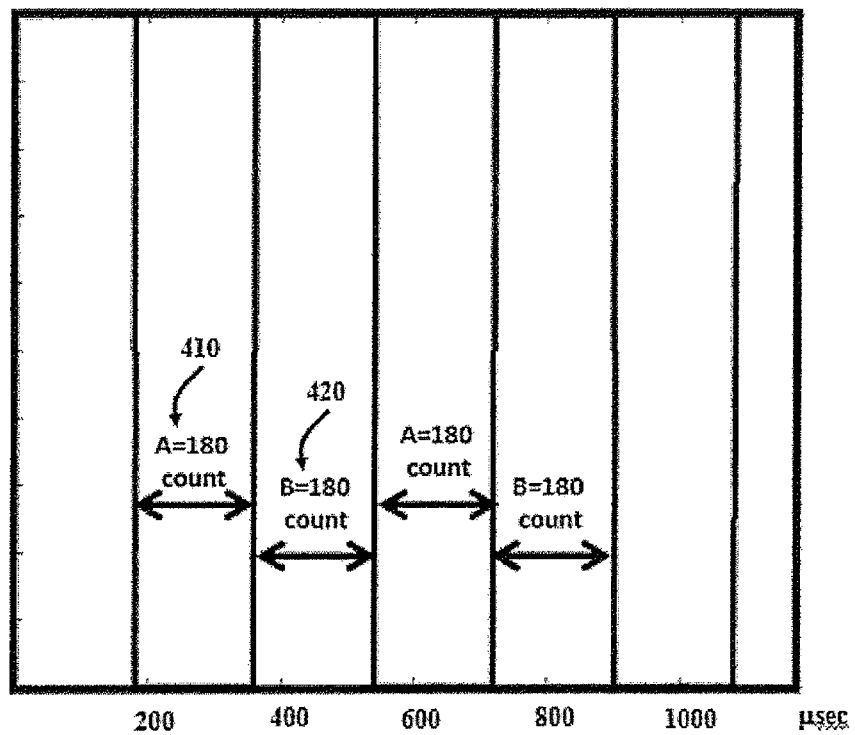
FIG. 4 shows an example of a high and low digital pulse.

In one embodiment, the offset detector may comprise a counter coupled with an internal clock. The counter may count the number of cycles of the internal clock relative to the high and low pulse width of the digitized output signals from the comparator. FIG. 4 shows a diagram of the count number of cycles of the internal clock in terms of time domain with respect digital pulses. Using the same example illustrated above in diagram 3A of FIG. 3, if the $V_{mid}$ of the sinusoidal output signal 310 received by the comparator 301 matches the $V_{mid}$ of the reference signal 320, for example, at 2.5V, the counts of the internal clock with respect to the width of the high and how digital pulses 330 generated by the comparator 301 may have an equal value. FIG. 4 shows an example of a high and low digital pulse. In FIG. 4, if the $V_{mid}$ of the sinusoidal output signal 310 received by the comparator 301 matches the $V_{mid}$ of the reference signal, the counts of the internal clock with respect to the high pulse 410 may be the same as the low pulse 420, ie. both have the value of 180 counts.

Figure 5:
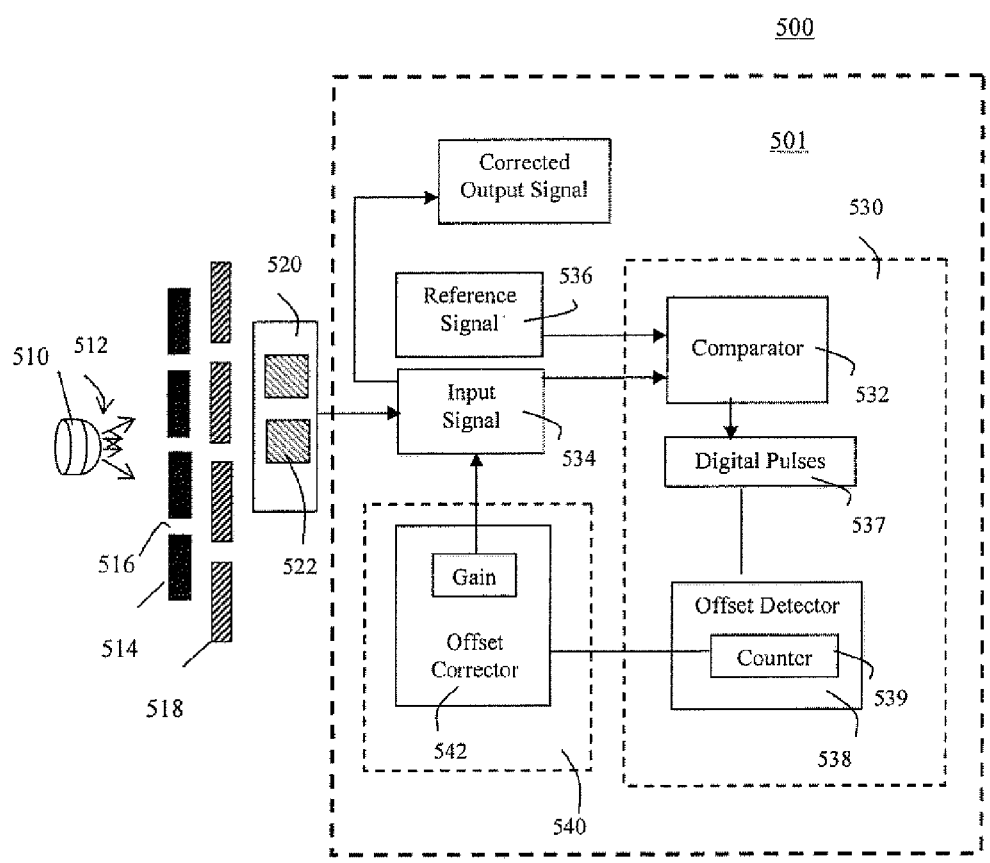
FIG. 5 is a block diagram of an optical encoder with offset correction system.

FIG. 5 shows a block diagram of an optical encoder 500 with offset correction system. The optical encoder system 500 may comprise light emitter 510 (which may be configured to emit a collimated beam of light 512), an encoder disk 514 having a plurality of apertures 516, a reticle 518, a light detector 520 with photodetectors 522, an offset detection circuit 530 and an offset corrector circuit 540.

In one embodiment, the reticle 518 may be configured to generate a quasi sinusoidal signal as well as to change or adjust the spatial resolution of the encoder 500. In one embodiment, the offset correction circuit 501 may comprise offset detection circuit 530 and an offset correction circuit 540. The offset detection circuit 530 may be configured to detect offsets of the sinusoidal output signals generated by the light detector 520 of the optical encoder 500 and the offset correction circuit 540 corrects the offsets.

The comparator 532 may be configured to receive as input signal 534 the sinusoidal output signals generated by the light detector 520 and a reference signal 536 to create digital pulses corresponding to both signals received. The reference signal 536 may be used for gauging offsets of sinusoidal output signals generated by the light detector 520. In one embodiment, the reference signal 536 may be a known voltage value where the middle point or targeted voltage ($V_{mid}$) of a sinusoidal signal value when the optical encoder 500 should have generated, if the optical encoder 500 is fully aligned. Alternatively, if the $V_{mid}$ of a sinusoidal output signal generated by the encoder system 500 is found to vary from the this targeted voltage ($V_{mid}$), this may mean that the generated sinusoidal output signal may have an offset.

In one embodiment, the comparator 532 may digitize the input signals 534 and the reference signal 536 to digital pulses 537, which may contain information about the offset of the input signal 534 with respect to the reference signals 536. In one embodiment, the offset detector 538 may be configured to determine an offset of the input signal 534 from the digital pulses 537. The offset detector 538 may include counter 539, which may be configured to determine the width of the digital pulses 537. The counter 539 may be coupled with an internal clock to count the number of cycles of the internal clock with respect to the width of the high and low digital pulse. If the sinusoidal output signals generated by the light detector have no offset, the counts of the internal clock with respect to the digitized high pulse may be equal to the counts of the internal clock with respect to the digitized low pulse.

In one embodiment, the optical encoder system 500 may include an offset corrector 542 coupled with the offset detection circuit 530 to correct the signal offset. The offset corrector 542 may receive information of number of cycles of the internal clock with respect to the high and low pulse width of the digital pulses form the counter 539. Offset corrector 542 may subsequently determine the amount of gain to apply in order to tune the middle point of the sinusoidal output signal up or down to correct the offset. In one embodiment, the offset corrector 542 may set a gain to bias the offset sinusoidal output signal and may send the corrected output signal as the final calibrated output signal.

Figures 6A, 6B:
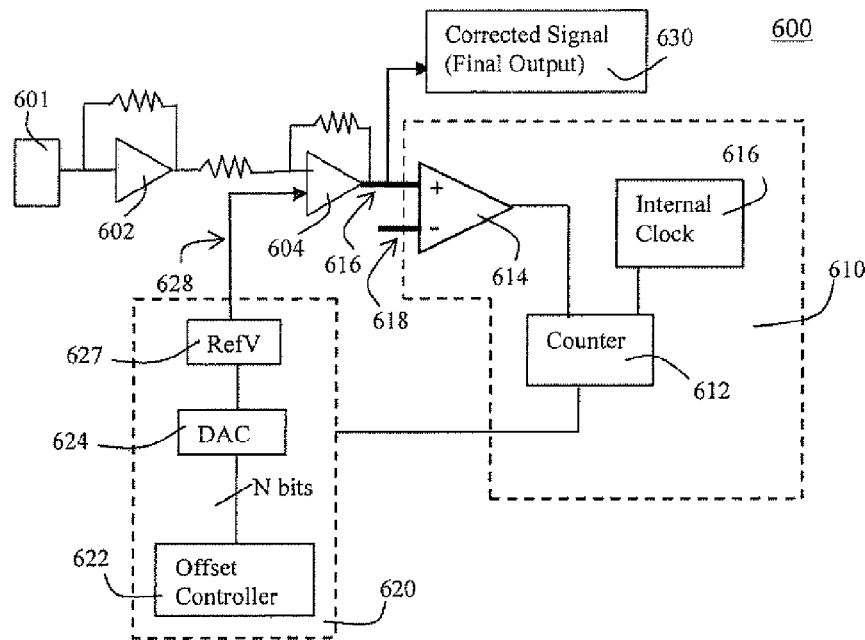
FIG. 6A shows a block diagram of an offset correction system.
FIG. 6B illustrates an example of a simplified operation of the offset corrector.

FIG. 6A shows an offset correction circuit 600 for an optical encoder system. In one embodiment, the offset correction circuit 600 may include a first amplifier 602 and a second amplifier 604, an offset detection circuit 610 and an offset corrector 620 coupled with the offset detection circuit 610 to correct a signal offset. The first amplifier 602 may be coupled with light detector 601 to receive the photocurrents signals generated by the light detector 601. The first amplifier 602 may be a Transimpedence Amplifier (TIA), which may be configured to convert the photocurrents generated by the light detector 601 to voltages.

The offset correction circuit 600 may include a second amplifier 604, which may be coupled between the first amplifier 602 and the comparator 614. The second amplifier 604 may be an operational amplifier, which may be configured in a closed loop arrangement as an inverting amplifier. In one embodiment, if the voltage peak generated by the first amplifier 602 may not be big enough to become significant or useful, a gain circuit may be added to the first amplifier 602 to further amplify the voltage signal.

Similarly, an additional copy of the same gain circuit as just discussed may likewise be added to the second amplifier 604. For example, in some embodiments, the signals from the second amplifier 604 may not have big enough voltage peak because of the implementation of a weak light source. Therefore, prior to being fed into the comparator 614, the voltage signals may be amplified so as to comprise big enough voltage peaks, which may become significant or useful for the comparator 614 to operate. However, such gain circuit may not be needed in embodiments that have big photodetectors or that have a very strong light source, which is capable of generating sufficient photocurrents.

In one embodiment, the offset detection circuit 610 may comprise a comparator 614, a counter 612 and an internal clock 616. The comparator may be configured to receive input signals 616 from the second amplifier 604 and a reference signal 618 to generate digital pulses corresponding to both signals received. As described in previous paragraphs, the reference signal 618 may be a known reference voltage or an ideal voltage value of the sinusoidal output signals, which the encoder system 600 may be expected to generate under a perfect condition. Therefore the reference signal 618 may be used as reference voltage for gauging offsets of sinusoidal output signals, which may be generated by the encoder system 600.

In one embodiment, the comparator 614 may digitize the input signals 616 and the reference signal 618 to digital pulses, which may comprise logic high level pulses separated by logic low level pulses (or, in other words, HIGH and LOW pulses respectively). These digital pulses may contain information about the offset of the sinusoidal signals with respect to the reference signals 618.

The counter 612 may be coupled with internal clock 616 to count the number of cycles of the internal clock, relative to width of the high and low digital pulses output from the comparator 614. Measurement of the digitized pulse width may be done by the counter 612. In practice, it may be preferred that the internal clock may have a much higher frequency than that of the input signal being measured. This may be preferred because accuracy of the offset detection may be dependent on the count frequency of the counter 612. Therefore, an offset detection system 610 with a higher count frequency may produce a better or more accurate result.

In one embodiment, if the input signal 616 has no offset, the width of the high and low pulses may have an equal value. Thus, in terms of time domain, the time of the digitized high pulse may be equal to the time of the digitized low pulse. This is with the assumption that the frequency of the sinusoidal signal may be constant, which may be calibrated during operation.

In one embodiment, the offset detection circuit 600 may comprise an offset corrector 620 coupled with the counter 612 to correct signal offset. The offset corrector 620 may receive signal offset information from the counter 612 to determine the amount of gain to apply for tuning the middle point of the offset signal up or down. The offset corrector 620 may further comprise an offset controller 622 and a DAC 624. In one embodiment, the offset controller 622 may be configured to adjust the value (or voltage) in the DAC 624 for correcting the offset in accordance to the detected offset level.

In one embodiment, the offset controller 622 may be configured to increase or decrease the values of the DAC 624, which may control the voltage reference setting (Ref V 627) output to the second amplifier 604. The offset controller 622 may use the voltage reference setting (Ref V 627) to tune or calibrate the offset signal up or down. Accordingly, the voltage reference setting (Ref V 627) may act as a DC point to bias the offset signal. In one embodiment, the corrected signal 630 may be output through the second amplifier 604.

FIG. 6B illustrates an example of a simplified operation of the offset corrector. As shown in FIG. 6A, the counter 612 may be configured to count the number of cycles of internal clock 616, relative to the width of the high and low digital pulses generated by the comparator 614. The counting of the high and low pulse of the comparator digitized signal may be used to determine whether to tune the middle point of the sinusoidal signal up or down.

For example, in row 2 of a table in FIG. 6B, if the width of the high pulse and the low pulse are equal to the ideal voltage value, this may indicate that the input signal has zero offset. Whereas in row 3, if the count of the width of the high pulse is lower than the ideal voltage value, the width of the low pulse may be higher. Thus this may indicate that the $V_{mid}$ of the sinusoidal signal input into the comparator may be lower than the reference voltage. In this case, the counter may subsequently send a signal (expressed in digital bits '01') to the offset controller to increase the $V_{mid}$ of that sinusoidal signal. For example, the output of the counter can be a 2 bit digital signal (00, 01, 10) which may provide instruction to the offset controller to shift the DAC value up or down.

Upon receiving the offset information from the counter, the controller may either increase or decrease the values in the DAC that controls the voltage reference setting (Ref V) output to the second amplifier to bias the offset signal. The control to the voltage reference setting (Ref V) output may be done digitally, by receiving the output of the counter signals and changing the bits of the DAC. For example, the controller may set the bits of the DAC to 8 bits, which may tune the $V_{mid}$ of the output signal up. Alternately, the controller may set the bits of the DAC to 2 bits, which may tune the $V_{mid}$ of the output signal down.

In one embodiment, an offset correction range may be set for the offset correction. For example, an offset correction range may be set on the DAC. For example, the DAC may be configured to correct a voltage range from 2V to 3V; that is from a $V_{mid}$ of 2.5V, it is +/−500 mV. Every step of the DAC may thus be approximately 3.9 mV.

In one embodiment, offset correction circuit 600 may be configured to correct signal offsets in a real time mode, or substantially real time mode, when the encoder 600 is in operation. However, in practice, in order to avoid a jerk, or sudden signal artifact, in the output signals, the offset correction may normally be performed gradually over a time period in a real time. For example, if the offset is detected to be at 2.8V, a change of 2.8V and 2.5V in one step will cause the sinusoidal signals to have a certain jerk, or sudden signal artifact. In order to avoid jerks or sudden signal artifacts in real time correction mode, the offset corrector may be configured to limit the change of steps in the DAC during the offset correction.

Figure 7:
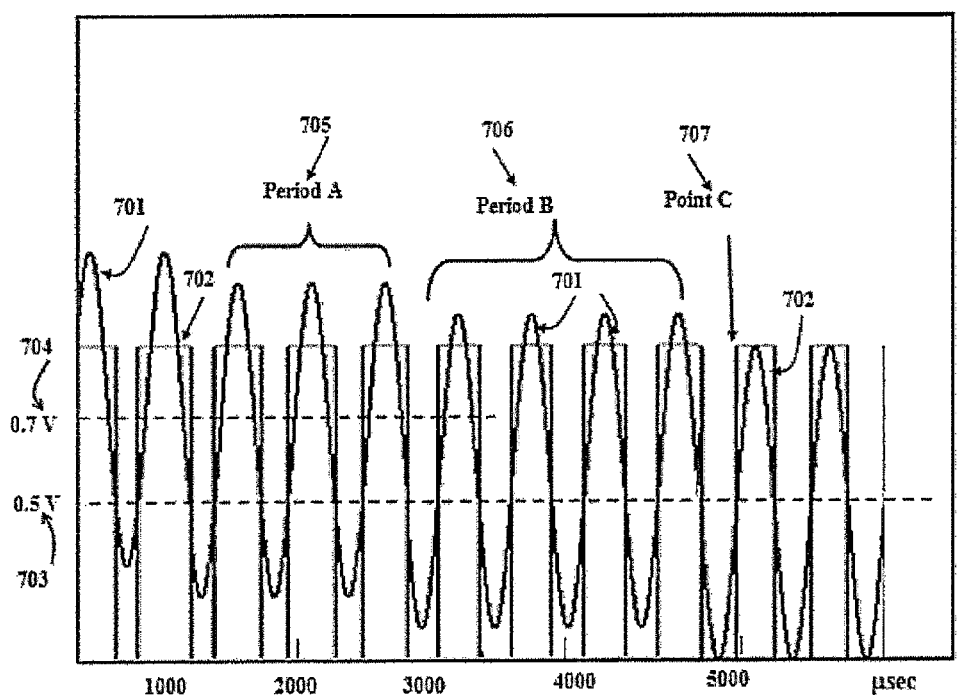
FIG. 7 shows a simplified signal diagram illustrating a gradual offset correction.

FIG. 7 shows a simplified signal diagram illustrating a gradual offset correction of an offset output signals 701 generated by an optical encoder system with respect to a reference signal 702 (eg. at 2.5V). For example, in order to avoid a jerk to the offset output signals 701 (or, in other words, to avoid a sudden signal artifact in the offset output signals 701), the offset correction circuit (not shown) may be configured to correct the $V_{mid}$ of the offset output signal 701 to ideal $V_{mid}$ 703 gradually, over a period of time.

For example, the offset correction circuit may correct the offset output signal 701 having a $V_{mid}$, say at 0.7V 704, to the ideal $V_{mid}$ 703 at 0.5V, gradually, over a period of 5000 μsec. In step one, the offset correction circuit may be configured to start the signal correction, for example from Period A 705 to Period B 706, first by tuning the $V_{mid}$, say at 0.7V 704 to 0.6V. Subsequently in step two, the offset correction circuit may tune the $V_{mid}$ further, until the offset signal reaches Point C 707 where the $V_{mjd}$ of the offset signal 701 may finally match the ideal $V_{mid}$ 703.

In another embodiment, the offset correction circuit may be implemented in an encoder system for correcting the alignments of the encoder during factory calibration. As described previously, the sinusoidal output signals generated by an encoder may have an offset due to misalignments, such as a misalignment of the code wheel or other supporting mechanical structures, during the assembly of the encoder. Therefore, the offset correction circuit may be implemented to identify and correct such misalignments during the factory calibration.

The various aspects, features, embodiments or implementations of the invention described above can be used alone or in various combinations.

Different aspects, embodiments or implementations may, but need not, yield one or more of the following advantages. One advantage of the invention may be providing for some compensation and/or correction for reticle misalignment, and more particularly may be providing for some compensation and/or correction for offset to the output signal generated by the encoder system. Another advantage may be providing for some compensation and/or correction for signal offset, which may be due to misalignment of other components inside the encoder system (e.g. code wheel wobbling, code wheel process tolerance such as TIR, tolerance for the placement of the photodetectors in relative to the code wheel and/or non-uniformity of the light spot).

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A signal offset correction system comprising:
   an offset detection circuit; and
   an offset corrector to correct a signal offset;
   wherein the offset detection circuit comprises:
      a comparator to receive an input signal and a reference signal to create digital pulses corresponding to both signals received; and
      an offset detector configured to determine an offset of the input signal from the digital pulses.

2. The signal offset correction system of claim 1, wherein the offset detector further comprises a counter configured to determine width of the digital pulses.

3. The signal offset correction system of claim 1, wherein the offset corrector is configured to apply a gain to the input signal to correct the signal offset.

4. An optical encoder with a signal offset correction system, comprising:
   a light emitter;
   an encoder disk;
   a light detector;
   an offset correction circuit, the offset correction circuit comprising:
      a comparator to receive output signals from the light detector and a reference signal to create digital pulses corresponding to both signals received;
      an offset detector configured to determine an offset of the output signals from the digital pulses; and
      an offset corrector coupled with the offset detector to correct the offset.

5. The optical encoder of claim 4, wherein the offset detector further comprises a counter configured to determine the width of the digital pulses.

6. The optical encoder of claim 4, wherein the offset corrector is configured to apply a gain to the output signal to correct the offset.

7. The optical encoder of claim 6, wherein the offset corrector is configured to correct the offset in a substantially real time manner.

8. The optical encoder of claim 7, wherein the offset corrector is configured to correct the offset in a substantially real time manner gradually in steps, for substantially avoiding a jerk in an offset output signal.

9. The optical encoder of claim 4, wherein further comprising a first and second amplifier, wherein the second amplifier is coupled between the first amplifier and the comparator, and wherein the offset corrector comprises an offset controller coupled with a Digital to Analog Converter.

10. The optical encoder of claim 4, further comprising a reticle disposed between the encoder disk and the light detector for adjusting spatial resolution of the optical encoder.

11. An optical encoder, comprising:
   a light detector configured to generate output signals; and
   an offset correction circuit, the offset correction circuit comprising:
      a comparator configured to digitize the output signals from the light detector and a reference signal to digital pulses;
      an offset detector configured to determine an offset of the output signals from the digital pulses; and
      a counter of the offset detector, the counter configured to determine a width of the digital pulses.

12. The optical encoder of claim 11, wherein the comparator is configured to generate differing pulse widths of the digital pulses, when the output signals from the light detector have the offset.

13. The optical encoder of claim 12, wherein the offset detector further comprises an internal clock, and wherein the counter is coupled with internal clock and configured to count a number of cycles of the internal clock relative to the width of the digital pulses.

14. The optical encoder of claim 11, wherein the offset correction circuit further comprises an offset corrector, and wherein the offset corrector is coupled with the offset detector and configured to correct the offset.

15. The optical encoder of claim 14, wherein the offset corrector is configured to apply a gain to the output signals of the light detector to correct the offset.

16. The optical encoder of claim 14, wherein the offset corrector is configured to determine an amount of gain to be applied to the output signals of the light detector to correct the offset.

17. The optical encoder of claim 11, wherein the offset correction circuit is configured to correct the offset gradually over a period of time.

18. The optical encoder of claim 11, wherein the offset correction circuit is configured to correct the offset in a substantially real time mode.

19. The optical encoder of claim 11, wherein:
   the light detector is configured to generate the output signals as photocurrents; and
   the optical encoder further comprises a first amplifier, and the first amplifier is configured to convert the photocurrents generated by the light detector to voltages.

* * * * *